(12) United States Patent
Suzuki

(10) Patent No.: US 8,713,315 B2
(45) Date of Patent: Apr. 29, 2014

(54) CONTENT DISTRIBUTION SYSTEM, MOBILE COMMUNICATION TERMINAL DEVICE, AND COMPUTER READABLE MEDIUM

(75) Inventor: Koji Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 189 days.

(21) Appl. No.: 13/237,598

(22) Filed: Sep. 20, 2011

(65) Prior Publication Data

US 2012/0191974 A1 Jul. 26, 2012

(30) Foreign Application Priority Data

Jan. 26, 2011 (JP) ................................. 2011-014429

(51) Int. Cl.
*H04L 9/32* (2006.01)
*H04L 9/00* (2006.01)
*H04L 9/28* (2006.01)
*G06F 11/30* (2006.01)
*G06F 12/14* (2006.01)

(52) U.S. Cl.
USPC ................ 713/168; 713/189; 380/28; 380/44

(58) Field of Classification Search
USPC .............................. 713/168, 189; 380/28, 44
See application file for complete search history.

(56) References Cited

U.S. PATENT DOCUMENTS

| 7,886,159 | B2 * | 2/2011 | Nonaka et al. ............... 713/193 |
| 2006/0072745 | A1 * | 4/2006 | Fukaya ........................... 380/28 |
| 2006/0280297 | A1 * | 12/2006 | Fukaya ........................... 380/28 |
| 2011/0138190 | A1 * | 6/2011 | Chase et al. ................. 713/189 |

FOREIGN PATENT DOCUMENTS

| JP | 2002-215462 A | 8/2002 |
| JP | 2002-314527 A | 10/2002 |
| JP | 2002-374240 A | 12/2002 |
| JP | 2007-074581 A | 3/2007 |

OTHER PUBLICATIONS

Lian, Shiguo, Dimitris Kanellopoulos, and Giancarlo Ruffo. "Recent Advances in Multimedia Information System Security." Informatica (Slovenia) 33.1 (2009): 3-24.*
Wen, Jiangtao, et al. "A format-compliant configurable encryption framework for access control of multimedia." Multimedia Signal Processing, 2001 IEEE Fourth Workshop on. IEEE, 2001.*

* cited by examiner

*Primary Examiner* — Luu Pham
*Assistant Examiner* — Kari Schmidt
(74) *Attorney, Agent, or Firm* — Sughrue Mion, PLLC

(57) ABSTRACT

A content distribution system includes a management device and a viewing device. The management device manages encrypted content information. The viewing device acquires the encrypted content information from the management device, decodes the encrypted content information, and allows the decoded content information to be viewed. The management device includes a view control information issuing unit. Upon receipt of a request from the viewing device to issue view control information, the view control information issuing unit issues view control information including decryption key information corresponding to an (i)-th random number corresponding to an ordinal number (i) among plural random numbers and period-of-validity information about a period of validity. The plural random numbers are shared between the management device and the viewing device. The viewing device includes a storage unit, a counting unit, a holding unit, a request unit, a calculation unit, a display controller, an update unit, and a deletion unit.

8 Claims, 11 Drawing Sheets

CONTENT DISTRIBUTION SYSTEM, MOBILE COMMUNICATION TERMINAL DEVICE, AND COMPUTER READABLE MEDIUM

CROSS-REFERENCE TO RELATED APPLICATIONS

This application is based on and claims priority under 35 USC 119 from Japanese Patent Application No. 2011-014429 filed Jan. 26, 2011.

BACKGROUND (i) Technical Field

The present invention relates to a content distribution system, a mobile communication terminal device, and a computer readable medium.

(ii) Related Art

In systems in which users send content distribution requests to a web server using mobile terminals such as mobile phone terminals and view the content distributed from the web server in response to the requests on the mobile terminals, there is a demand for technologies for preventing unauthorized dissemination of content information when the users are confronted with a situation in which their mobile phone terminals have been stolen.

It may be possible to prevent such unauthorized dissemination of content information by saving content information acquired from a web server only in a cache memory of a browser in a mobile terminal and deleting the content information when the browser is closed. A technique is also available in which content information is basically held in the main body of a device so that the owner of the device may not be required to download the content information each time the owner wishes to access it to improve protection of content.

SUMMARY

According to an aspect of the invention, there is provided a content distribution system including a management device and a viewing device. The management device manages encrypted content information. The viewing device acquires the encrypted content information from the management device, decodes the encrypted content information, and allows the decoded content information to be viewed. The management device includes a view control information issuing unit. Upon receipt of a request from the viewing device to issue view control information including an ordinal number (i), the view control information issuing unit issues view control information including decryption key information corresponding to an (i)-th random number corresponding to the ordinal number (i) among plural random numbers and period-of-validity information about a period of validity. The plural random numbers are shared between the management device and the viewing device. The viewing device includes a storage unit, a counting unit, a holding unit, a request unit, a calculation unit, a display controller, an update unit, and a deletion unit. The storage unit stores the encrypted content information acquired from the management device. The counting unit counts the ordinal number (i). The holding unit holds encrypted common key information. The encrypted common key information is encrypted using the (i)-th random number among the plural random numbers. The request unit sends a request to the management device to issue the view control information including the ordinal number (i). The calculation unit calculates common key information by receiving the view control information transmitted from the management device in response to the request sent from the request unit and by decoding the encrypted common key information held in the holding unit using the decryption key information included in the view control information. The display controller decodes the encrypted content information stored in the storage unit using the common key information calculated by the calculation unit to produce viewable content information, and displays the viewable content information. The update unit updates the encrypted common key held in the holding unit when the period of validity indicated by the period-of-validity information included in the received view control information expires, by re-encrypting the common key information calculated by the common key calculation unit using an (i+1)-th random number corresponding to an ordinal number (i+1) counted by the counting unit. The deletion unit deletes the common key information subjected to re-encryption, the (i+1)-th random number used for re-encrypting the common key information among the shared random numbers, and the view control information after the update unit has updated the encrypted common key.

BRIEF DESCRIPTION OF THE DRAWINGS

Exemplary embodiment(s) of the present invention will be described in detail based on the following figures, wherein.

DETAILED DESCRIPTION

Figure 1:
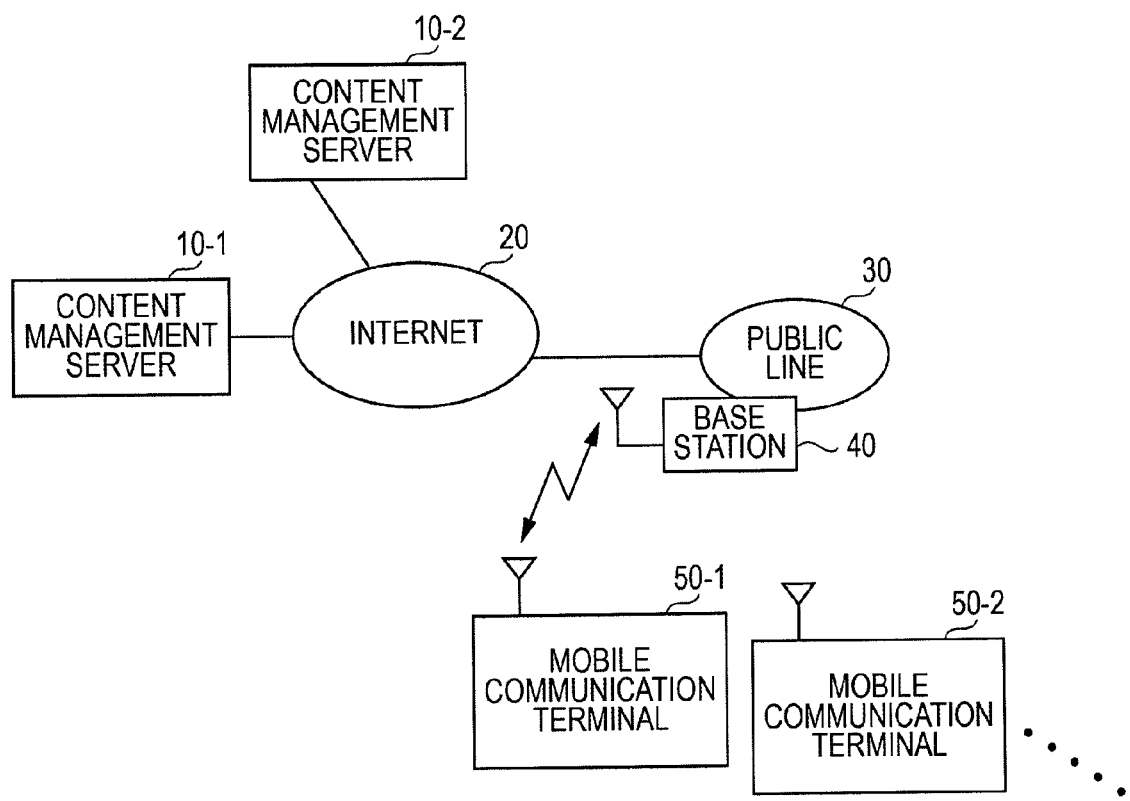
FIG. 1 is a conceptual diagram illustrating the overall configuration of a content distribution system according to an exemplary embodiment of the present invention.

FIG. 1 is a conceptual diagram illustrating the overall configuration of a content distribution system according to an exemplary embodiment of the present invention.

In the system, content management servers 10 (10-1, 10-2) that manage content information are deployed in the Internet 20, and mobile communication terminals 50 (50-1, 50-2) and a radio base station 40 located in a public network 30 connected to the Internet 20 are connected to one another via a wireless communication line.

While two content management servers 10 and two mobile communication terminals 50 are illustrated in FIG. 1, it is to be anticipated that more than two content management servers 10 and more than two mobile communication terminals 50 may be located.

Examples of the mobile communication terminals 50 include wireless phone terminals, smartphones, and mobile information terminals (personal digital assistants (PDAs)).

In the illustrated system, the content management servers 10 manage, for example, encrypted content information, and the mobile communication terminals 50 have a content view control function for receiving and holding encrypted content information from the content management servers 10, decoding the held encrypted content information in accordance with the content viewing start operation of users, and displaying the content information on a display in a viewable manner.

Figure 2:
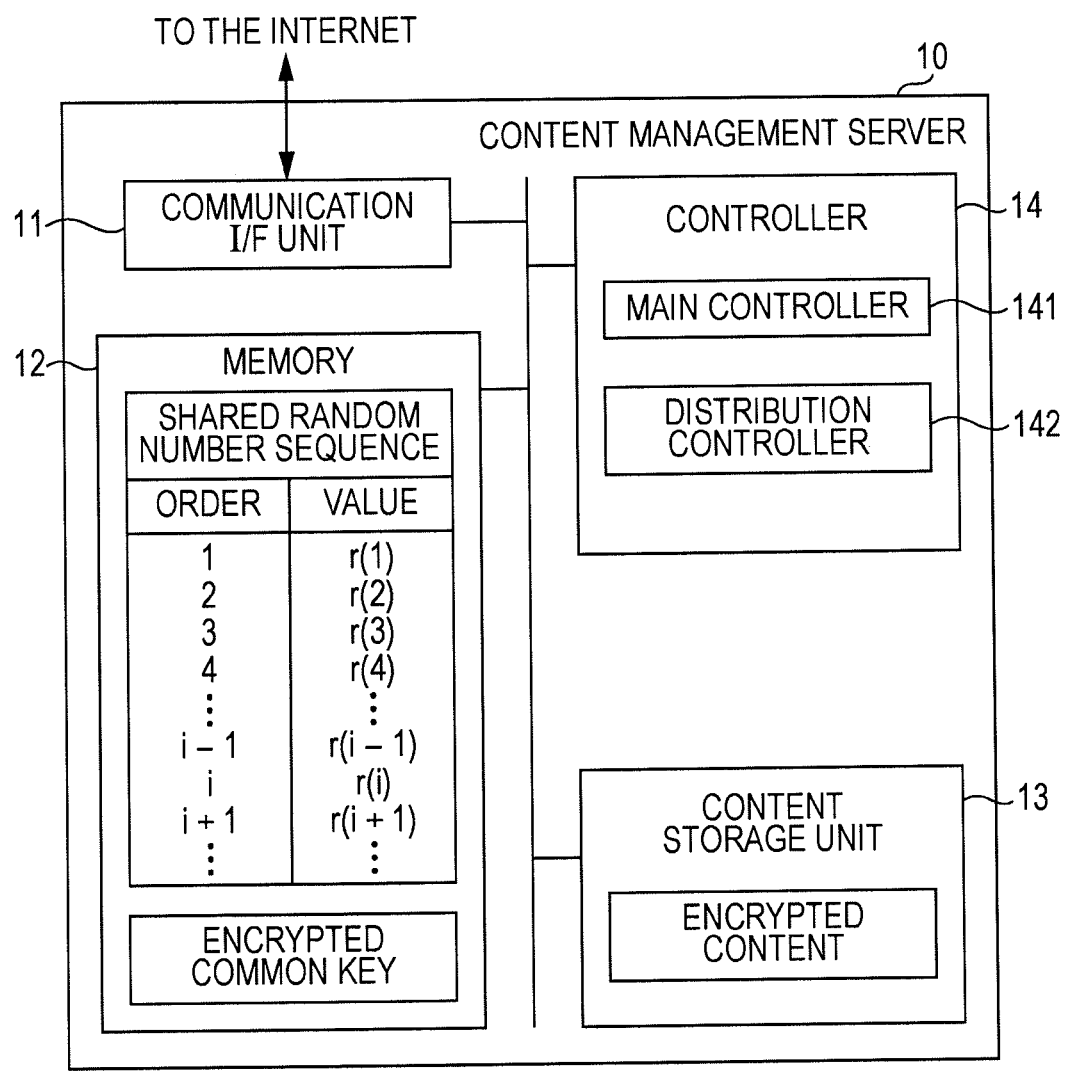
FIG. 2 is a block diagram illustrating the functional configuration of a content management server.
Figure 3:
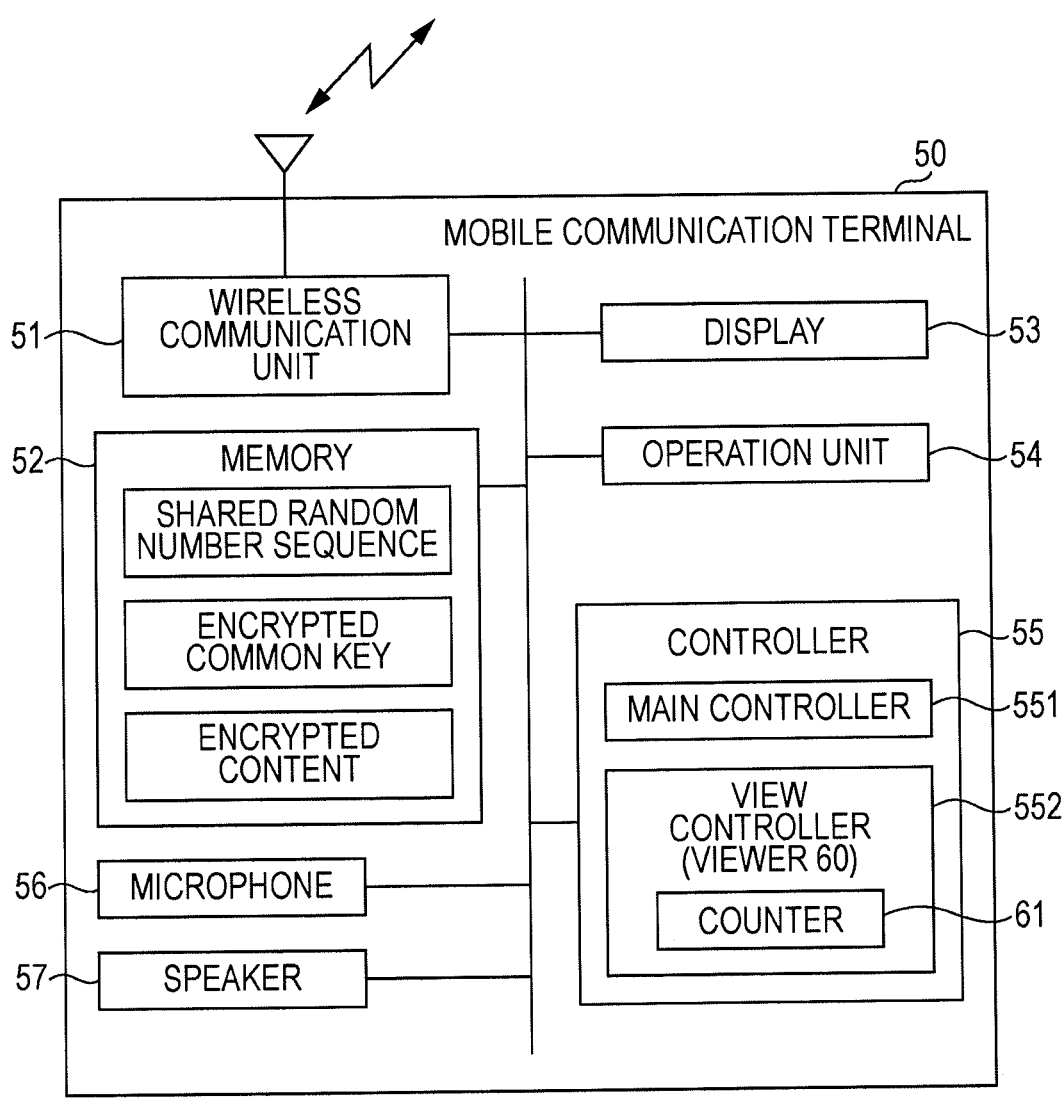
FIG. 3 is a block diagram illustrating the functional configuration of a mobile communication terminal.

FIG. 2 illustrates the functional configuration of each of the content management servers 10, and FIG. 3 illustrates the functional configuration of each of the mobile communication terminals 50.

In FIG. 2, each of the content management servers 10 may be formed of, for example, a general-purpose computer, and includes a communication interface (I/F) unit 11, a memory 12, a content storage unit 13, and a controller 14. The communication I/F unit 11 serves as a communication interface with the Internet 20 when communicating with the mobile communication terminals 50 via the Internet 20 and the public network 30. The memory 12 stores an operating program and various kinds of information such as a shared random number sequence to be distributed to the mobile communication terminals 50 and the encrypted common key. The content storage unit 13 may be formed of a hard disk drive (HDD) or the like, and stores content information (for example, encrypted content information). The controller 14 includes a central processing unit (CPU) and a memory serving as a main memory unit such as a read only memory (ROM) or a random access memory (RAM), and controls the overall operation of the content management server 10.

The controller 14 of the content management server 10 includes a main controller 141 and a distribution controller 142. The main controller 141 collectively controls the individual functional units. The distribution controller 142 controls the distribution of encrypted content information to the mobile communication terminals 50 via, for example, the communication I/F unit 11, and also controls the initial setting of an operating environment necessary to control the viewing of content on the mobile communication terminals 50 side. The distribution controller 142 further controls the distribution of information such as decryption keys used to decode encrypted content information held in the mobile communication terminals 50 under the initial set operating environment.

As illustrated in FIG. 3, each of the mobile communication terminals 50 includes a wireless communication unit 51, a memory 52, a display 53, an operation unit 54, a controller 55, a microphone 56, and a speaker 57. The wireless communication unit 51 controls wireless communication with the base station 40 located in the public network 30. The memory 52 stores an operating program and various kinds of information distributed from the content management servers 10, such as encrypted content information and a shared random number sequence. The display 53 may be formed of a liquid crystal display or the like, and displays various kinds of information. The operation unit 54 may be formed of a ten-key pad, a touch panel, or the like, and may be used to enter various kinds of information or give instructions. The controller 55 includes a CPU and a memory serving as a main memory unit such as a ROM or a RAM, and controls the overall operation of the mobile communication terminal 50. The microphone 56 is configured to receive audio such as mouthpiece audio, and the speaker 57 is configured to reproduce (or generate) audio such as earpiece audio.

The controller 55 of the mobile communication terminal 50 includes a main controller 551 and a view controller 552. The main controller 551 collectively controls the individual functional units. The view controller 552 includes a counter 61 that counts the ordinal number (i). The view controller 552 decodes encrypted content information selected in accordance with the view instruction operation of the user under the initial set operating environment, and displays the content information on the display 53 in a viewable manner.

In the configuration of the content management servers 10 and the mobile communication terminals 50 described above, each of the content management servers 10 may further include an external I/F unit separate from the communication I/F unit 11, and each of the mobile communication terminals 50 may further include an external I/F unit separate from the wireless communication unit 51 so that data may be transmitted and received between the content management servers 10 and the mobile communication terminals 50 during the initial setting operations described above.

In each of the content management servers 10, the distribution controller 142 also has a function of controlling the management of content information.

When controlling the management of content information, for example, the distribution controller 142 may store unencrypted (or plaintext) content information sent from a personal computer (PC) or the like by encrypting the content information and holding the encrypted content information in a certain storage area of the content storage unit 13 in such a manner that the content information may be made readable from the storage area.

Plaintext content information is encrypted using a common key. In this exemplary embodiment, encryption may be based on one common key for plural mobile communication terminals 50, or common keys each used for one mobile communication terminal 50.

In the former case, pieces of encrypted content information encrypted using one common key are managed in association with all the mobile communication terminals. In the latter case, pieces of encrypted content information encrypted using multiple common keys are managed in association with the corresponding mobile communication terminals 50.

In each of the content management servers 10, furthermore, the distribution controller 142 holds and manages plural random numbers in, for example, the memory 12, and distributes the plural random numbers to each of the mobile communication terminals 50 through an initial setting operation described below to share the plural random numbers with the mobile communication terminals 50.

In FIG. 2, an image in which the plural random numbers are managed in the memory 12 is illustrated by way of example.

Referring to FIG. 2, the plural random numbers stored in the memory 12 are assigned order numbers 1, 2, ..., (i−1), and (i+1).

The values of the random numbers representing the order numbers are $r(1), r(2), \ldots, r(i-1), r(i), r(i+1), \ldots$, and have each a data size of, for example, 2048 bits.

In this exemplary embodiment, therefore, examples of the plural random numbers include a random number sequence in which random numbers each having a single unique value corresponding to the ordinal number (i) are arranged in the order of the ordinal numbers (i=1, 2, 3, ..., i, ...). In the following description, the term "plural random numbers" refers to the random number sequence described above, and the first random number, the second random number, ..., and the (i)-th random number in the plural random numbers refer to random numbers r(1), r(2), ..., r(i), respectively.

In the content management servers 10, the shared random numbers described above are used for the generation of a decryption key that is used to decode the common key described above. In the mobile communication terminals 50, on the other hand, the shared random numbers described above are used for the re-encryption of the common key.

Figure 4:
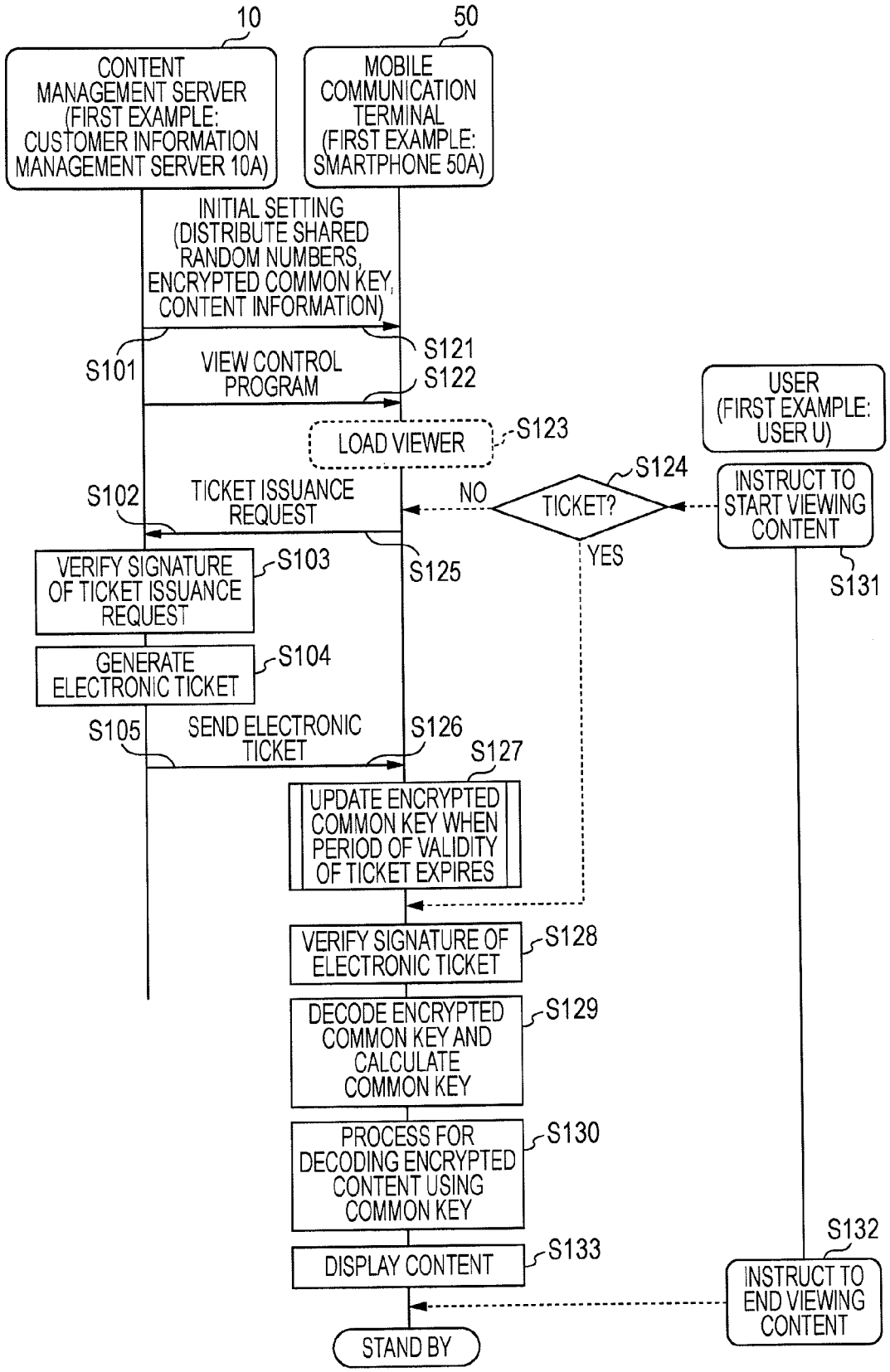
FIG. 4 illustrates a content view control sequence for the system according to the exemplary embodiment.

First, each of the content management servers 10 and each of the mobile communication terminals 50 having the configuration described above execute an initial setting process for content view control in accordance with, for example, a control sequence illustrated in FIG. 4.

In the initial setting process, the distribution controller 142 of the content management server 10 transmits plural (for example, k) pieces of random number information with assigned order numbers, encrypted common key information, and encrypted content information to the mobile communication terminal 50 using, for example, a virtual private network (VPN) or the like (step S101).

Among the pieces of information used in the initial setting process described above, the random number information and the encrypted common key information are created in advance in, for example, an information processing device (PC) (not illustrated). The created random number information and encrypted common key information are transmitted from the information processing device to the content management server 10 via the Internet 20, and are stored in the memory 12.

In the illustrated example, furthermore, the content information managed by the content management server 10 is stored in the content storage unit 13 in such a manner that the content information has been encrypted in advance. The content information is read from the content storage unit 13, and is sent to the mobile communication terminal 50.

In the mobile communication terminal 50, on the other hand, the main controller 551 receives (step S121) plural pieces of random number information with assigned order numbers, encrypted common key information, and encrypted content information, which are sent from the content management server 10, and stores the received information in, for example, the associated areas of the memory 52.

After the completion of the initial setting process described above, the main controller 551 of the mobile communication terminal 50 accesses the Internet 20 to download a content view control program from a website run by, for example, the provider of the content information held in the content management server 10 (step S122). The content view control program is stored in the view controller 552 (step S123).

The content view control program may be stored in the content management server 10, and the mobile communication terminal 50 may access the content management server 10 and download the content view control program from the area where the content view control program is stored.

The content view control program may also be installed in advance in the mobile communication terminal 50.

The content view control program is called a viewer, and has a processing function for decoding encrypted content information that has been loaded in the memory 52 and displaying the decoded content information on the display 53.

Upon receipt of a viewing start instruction operation performed by a user using the operation unit 54 (step S131), the view controller 552 of the mobile communication terminal 50 in which the viewer has been loaded checks whether or not an electronic ticket is present (or held) (step S124).

The electronic ticket is view control information used by the content management server 10 to send various kinds of control information used for view control (including the decryption key corresponding to the (i)-th random number (see FIG. 2)) to the mobile communication terminal 50.

If an electronic ticket is present (YES in step S124), the process proceeds to a content view process (process after step S128) that is performed using the decryption key included in the electronic ticket.

If no electronic ticket is present (NO in step S124) (also if it is determined in step S128, described below, that the signature of the electronic ticket is not authentic), the view controller 552 transmits a request for issuing an electronic ticket including the ordinal number (i) currently counted by the counter 61 to the content management server 10 (step S125).

In this exemplary embodiment, a server (electronic ticket issuing server) different from the content management server 10 may have the function of issuing an electronic ticket. If no electronic ticket is present, the ticket issuing server may be requested to issue an electronic ticket.

Upon receipt of a ticket issuance request from the mobile communication terminal 50 (step S102), the content management server 10 verifies the signature of the ticket issuance request (step S103). If it is verified that the signature of the ticket issuance request is the same as the signature of the mobile communication terminal 50, the content management server 10 refers to the ordinal number (i) included in the ticket issuance request, and generates an electronic ticket including the decryption key corresponding to the (i)-th random number (step S104). The electronic ticket is transmitted to the mobile communication terminal 50 that has sent the ticket issuance request (step S105).

In the mobile communication terminal 50, upon receipt of the electronic ticket from the content management server 10 (step S126), the view controller 552 verifies the signature of the electronic ticket (step S128). If it is verified that the signature of the electronic ticket is the same as the signature of the content management server 10, the view controller 552 extracts the decryption key included in the electronic ticket, and then proceeds to a process for decoding the encrypted content information.

In the content information decoding process, the encrypted common key information is decoded using the decryption key information extracted from the received electronic ticket, and then the common key is calculated (step S129). The encrypted content information is decoded to obtain plaintext using the common key (step S130). After that, the decoded content information is displayed on the display 53 (step S133).

If a viewing end instruction operation is received from a user during the display of the content information (step S132), the display of the content information is stopped. Then, the state of the mobile communication terminal 50 returns to a standby state.

The electronic ticket issued by the content management server 10 may include information indicating the period of validity of an electronic ticket (for example, information about the date of expiry until the electronic ticket is valid).

Accordingly, in the mobile communication terminal 50, after an electronic ticket is received in step S126, in addition to the process up to step S131, the view controller 552 checks the information indicating the period of validity included in the electronic ticket. If the period of validity expires, the view controller 552 updates the encrypted common key (or implements a re-encryption process) (step S127).

Specifically, the counter 61 increments the ordinal number (i) to (i+1). A common key that has been calculated at this time is re-encrypted using the (i+1)-th random number (see FIG. 2) and is held.

When the encrypted common key is updated, as described in detail below, the common key subjected to re-encryption, the (i+1)-th random number used for the re-encryption of the common key among the shared random numbers, the currently held electronic ticket, and the decryption key extracted from the electronic ticket are deleted.

As described above, the viewer loaded in the mobile communication terminal 50 as the view controller 552 shares plural random numbers, to which order numbers have been assigned, with the content management server 10, and implements view control of content by sequentially using the (i)-th random number as an encryption key (or using an encryption key generated using the (i)-th random number).

The content distribution processing operation performed in the content distribution system according to this exemplary embodiment will be described hereinafter in more detail with respect to specific examples.

First Example

In a first example, the content distribution system illustrated in FIG. 1 may be applied to a customer information management system.

In the customer information management system, the relationship illustrated in FIG. 4 among the content management server 10, the mobile communication terminal 50, and the user corresponds to, as additionally represented in the respective blocks, the relationship among a customer information management server 10A that manages customer information files containing information about customers of a company (Company A), a smartphone 50A used by a salesperson of Company A, and a user U.

In the first example, the content management server 10 and the mobile communication terminal 50 are implemented using the customer information management server 10A that manages customer information files containing information about customers of Company A and the smartphone 50A, respectively. The user U who is a salesperson of Company A (hereinafter referred to simply as the "user") uses the smartphone 50A to download the customer information files of Company A from the customer information management server 10A and to view the customer information files in locations outside the company for sales activities.

The customer information files are stored in a disc (content storage unit 13) (see FIG. 2) in the customer information management server 10A (hereinafter referred to as the "server 10A"). The customer information files have been encrypted using 256-bit key for the Advanced Encryption Standard (AES) cryptosystem that is a common-key cryptosystem.

The smartphone 50A used by the user has a viewer 60 (view controller 552) (see FIG. 3) for decoding an encrypted customer information file and presenting the decoded customer information file to the user. The user views the customer information file using the viewer 60.

In the first example, by way of example, the Rivest-Shamir-Adleman (RSA) (including cryptographic schemes such as encryption, signature, and key exchange) public-key cryptosystem may be used in addition to the AES cryptosystem in order to protect a customer information file.

In the server 10A, on the other hand, k random numbers (see the random number sequence held in the memory 12 illustrated in FIG. 2) are generated in the initial setting operation before a service for viewing the customer information files is provided.

That is, the server 10A combines plural random numbers having assigned order numbers 1 to k and having values r(1), r(2), . . . , r(i), . . . , r(k) to create a single random number sequence.

Before the user U uses a customer information file, the server 10A further delivers the random number sequence, the customer information file, the modulus N for the RSA cryptosystem, and the encrypted common key to the smartphone 50A in advance using a safe path such as a VPN (see step S101 in FIG. 4).

Alternatively, for example, the server 10A and the smartphone 50A may be connected to each other via a universal serial bus (USB) cable or any other suitable medium, and the above pieces of information may be sent from the server 10A to the smartphone 50A via the external I/F unit.

In the initial setting operation, as described above, the customer information file in the information sent from the server 10A to the smartphone 50A has been encrypted using 256-bit AES.

Here, the common key used for the AES encryption of the customer information file is represented by Kd.

As used herein, Kd denotes an encryption key and a decryption key based on a common key cryptosystem. In this exemplary embodiment, a common key Kd may also be expressed as a decryption key Kd. Further, an encrypted common key may also be expressed as an encrypted decryption key.

In the first example, furthermore, by way of example, the RSA public-key cryptosystem may be used in addition to the AES cryptosystem. The common key Kd delivered from the server 10A to the smartphone 50A is encrypted using a public-key cryptosystem such as RSA.

In the initial setting operation described above, the common key Kd may be encrypted using the random number r(1) as an encryption key.

In this case, a specific value X(1) of the encrypted common key is equal to the smallest positive integer that is equivalent to the expression:

$$X(1)=[Kd^{\wedge}\{r(1)\} \bmod N].$$

Similarly, in the procedure for encrypting the common key Kd, which will be described below, a specific value of the encrypted common key X(i) when the random number r(i) is used as a key is equal to the smallest positive integer that is equivalent to the expression:

$$X(i)=[Kd^{\wedge}\{r(i)\} \bmod N].$$

The server 10A holds 1024-bit primes p and q as secret information in order to calculate the decryption keys d(i) corresponding to the above encryption keys (random numbers r(i)).

The primes p and q are prime factors of the modulus (modulo, or "mod") N, and N=pq holds true.

The modulus N is a number uniquely assigned to, for example, the smartphone 50A illustrated in FIG. 4. Moduli different from N are assigned to smartphones (for example, 50A-2, 50A-3, . . . ) (not illustrated in FIG. 4) used by other users of Company A so as to correspond to the respective smartphones.

In the customer information management system according to the first example, therefore, even if the smartphone 50A has been lost or stolen, the other smartphones (50A-2, 50A-3, . . . ) may be safely kept.

As described in detail below (see FIG. 5), the server 10A makes the (i)-th electronic ticket include the ordinal number (i), the decryption key d(i) corresponding to the encryption key (random number) r(i), and any other suitable information before delivering the (i)-th electronic ticket to the smartphone 50A.

Here, the value (i) represents the order number or ordinal number of an electronic ticket, and is associated with the smartphone 50A.

That is, if an electronic ticket is distributed to plural smartphones 50, the server 10A manages, for each of the smartphones 50, the value (i) (corresponding to, for example, the number of times the smartphone 50 accesses the electronic ticket).

Thus, if the number of times the electronic ticket is accessed differs from one smartphone to another, for example, the fifth electronic ticket (including the decryption key d(5) corresponding to the fifth random number r(5)) may be delivered to each corresponding smartphone 50, or the seventh electronic ticket (including the decryption key d(7) corresponding to the seventh random number r(7)) may be delivered to each corresponding smartphone 50.

Further, the server 10A calculates, using the Euclidean algorithm, a positive integer d(i) satisfying the following expression:

$$r(i)d(i)=[1 \bmod (p-1)(q-1)],$$

and uses the resulting value as the decryption key d(i) corresponding to the encryption key r(i).

Figure 5:
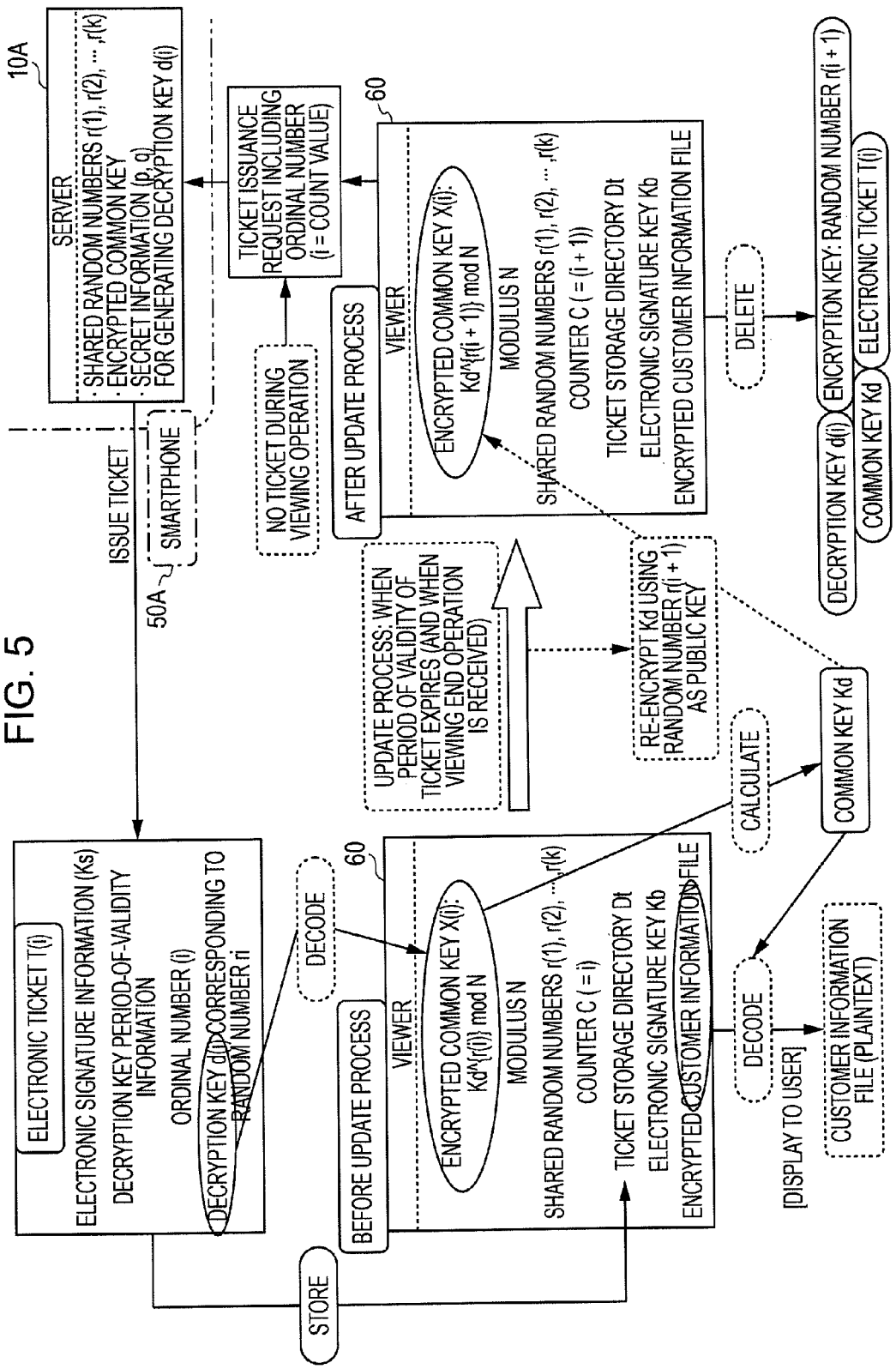
FIG. 5 is a conceptual diagram illustrating a flow of information in a viewer according to a first example.

FIG. 5 conceptually illustrates the relationship between an electronic ticket used in the first example and information in the viewer 60, and a flow of the process implemented by the viewer 60 in order to help easily understand how to generate the decryption key d(i) and how to use the decryption key d(i) in the decoding process.

In FIG. 5, the viewer 60 holds the information sent from the server 10A in the initial setting process, namely, a shared random number sequence, a customer information file, the modulus N for the RSA cryptosystem, and an encryption common key. The viewer 60 also holds the electronic signature key Kv of the smartphone 50A.

As the encrypted common key at the time when the initial setting operation is completed, a value generated using the first random number r(1) and sent from the server 10A, which is given by the expression (or a value equal to the smallest positive integer that is equivalent to the expression):

$$X(1)=[Kd^\{r(1)\} \bmod N],$$

is held.

In this case, the count value of the counter 61 is incremented from the initial value "0 (zero)" to "1" when the encrypted common key X(1) is received and held.

After that, upon receipt of a viewing start instruction operation from the user, the viewer 60 transmits a ticket issuance request including the count value i representing the ordinal number (i) counted by the counter 61 to the server 10A if no electronic ticket T(i) is present.

Upon receipt of a ticket issuance request from the smartphone 50A, the server 10A calculates the decryption key d(i) corresponding to the random number r(i) from the (i)-th random number r(i) among the random numbers shared with the smartphone 50A and from the secret information (p, q). Further, the server 10A creates an electronic ticket T(i) including the decryption key d(i), electronic signature information Ks about the server 10A, decryption key period-of-validity information, the ordinal number (i), and any other suitable information, and transmits the electronic ticket T(i) to the smartphone 50A that has sent the request.

In the smartphone 50A, on the other hand, upon receipt of the electronic ticket T(i), the viewer 60 stores the electronic ticket T(i) in a ticket storage directory Dt, and reads the period-of-validity information included in the electronic ticket T(i) to confirm that the electronic ticket T(i) has not expired. Then, the viewer 60 extracts the decryption key d(i) from the electronic ticket T(i), decodes the encrypted common key X(i) using the decryption key d(i), and further calculates a decryption key Kd from the decoded value.

Then, the viewer 60 performs a cryptographic process on the encrypted customer information file using the calculated decryption key Kd to produce a plaintext customer information file, and displays the customer information file on the display 53.

If a viewing end instruction operation is received from the user during the display of the customer information file or if the period of validity of the electronic ticket T(i) received from the server 10A and held in the viewer 60 expires, the viewer 60 causes the counter 61 to count the ordinal number (i), and sets (or increments) the count value to (i+1). Then, the viewer 60 calculates the (i+1)-th encrypted decryption key X(i+1) using the (i+1)-th random number corresponding to the count value (1+1), and holds the (i+1)-th encrypted decryption key X(1+1).

When the re-encryption of the decryption key Kd ((X(i+1)) is completed, the current common key Kd, the (i+1)-th random number used to re-encrypt the decryption key Kd, the held electronic ticket T(i), and the decryption key d(i) extracted from the electronic ticket T(i) are deleted. Then, the smartphone 50A enters the standby state.

Figure 6:
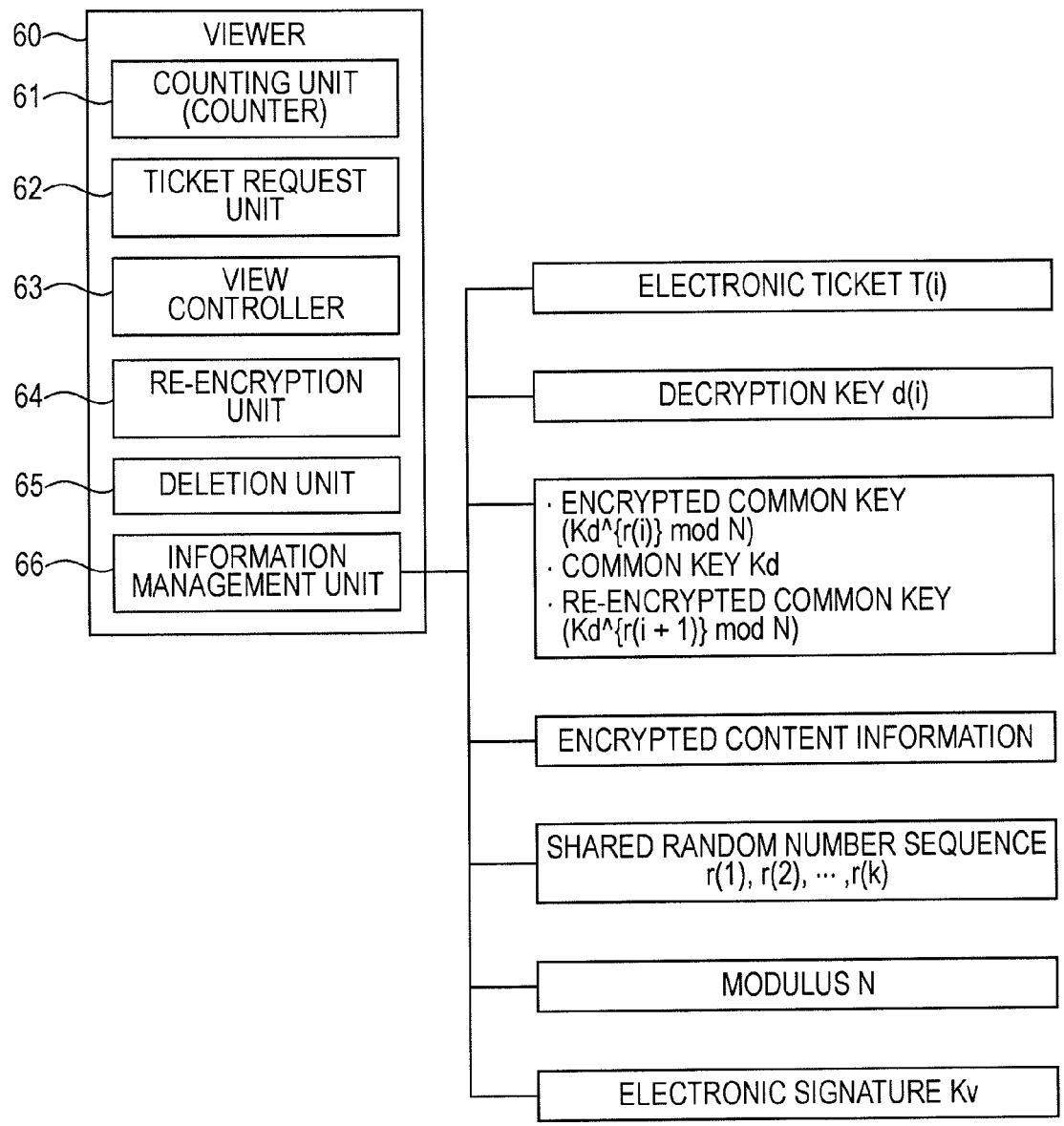
FIG. 6 is a block diagram illustrating the of functional configuration of the viewer according to the first example.

FIG. 6 is a block diagram illustrating the functional configuration of the viewer 60 that implements the series of processes illustrated in FIG. 5.

Specifically, as may be seen from the series of processes illustrated in FIG. 5, the viewer 60 according to the first example is implemented as a view control program in a viewing device (smartphone 50A). The viewing device (smartphone 50A) is connected to a management device (server 10A) that manages customer information (content information), and holds encrypted content information managed by the server 10A, and plural random numbers shared with the server 10A. The viewer 60 includes a counting unit (counter) 61, a ticket request unit 62, a view controller 63, a re-encryption unit 64, a deletion unit 65, and an information management unit 66. The counting unit 61 counts the ordinal number i (i=1, 2, 3, ...). The ticket request unit 62 makes a request for issuing view control information (ticket) including the ordinal number (i) counted by the counting unit 61 among the shared random numbers. The view controller 63 has a common key calculating function and a display control function. The common key calculating function is a function for receiving a ticket including decryption key information corresponding to the (i)-th random number among the shared random numbers and period-of-validity information, which is sent from the server 10A in response to the ticket issuance request made by the ticket request unit 62, and calculating a common key by decoding the encrypted common key information held in the viewer 60 using the decryption key information included in the ticket. The display control function is a function for decoding the encrypted content information using the common key calculated by using the common key calculating function to produce content information, and displaying the content information on a display. The re-encryption unit 64 has a holding function and an update function. The holding function is a function for holding encrypted common key information encrypted using the (i)-th random number corresponding to the ordinal number (i) counted by the counting unit 61 among the shared random numbers. The update function is a function for updating the encrypted common key information held by using the holding function when the period of validity of the ticket received from the server 10A, which is indicated by the period-of-validity information included in the ticket, expires, by re-encrypting the common key calculated by using the common key calculating function using the (i+1)-th random number corresponding to the ordinal number (i+1) counted by the counting unit 61. After the encrypted common key is updated by using the update function, the deletion unit 65 deletes the common key subjected to re-encryption, the (i+1)-th random number used for the re-encryption of the common key among the shared random numbers, and the ticket. The information management unit 66 manages various kinds of information used for controlling the viewing of the encrypted content information.

The information managed by the information management unit 66 includes, for example, the electronic ticket T(i) stored in the ticket storage directory Dt, the decryption key d(i) extracted from the electronic ticket T(i), the encrypted common key X(i) generated using the decryption key d(i), the common key Kd, the re-encrypted common key X(i+1), the shared random number sequence acquired in the initial setting operation, the encrypted common key X(1), encrypted content information, the electronic signature Kv of the viewer 60, which is set by using a PC or the like, and any other suitable information (see FIG. 5).

The operation of viewing a customer information file using the smartphone 50A in the customer information management system according to the first example will be described hereinafter with reference to FIGS. 7 to 10.

Figure 7:
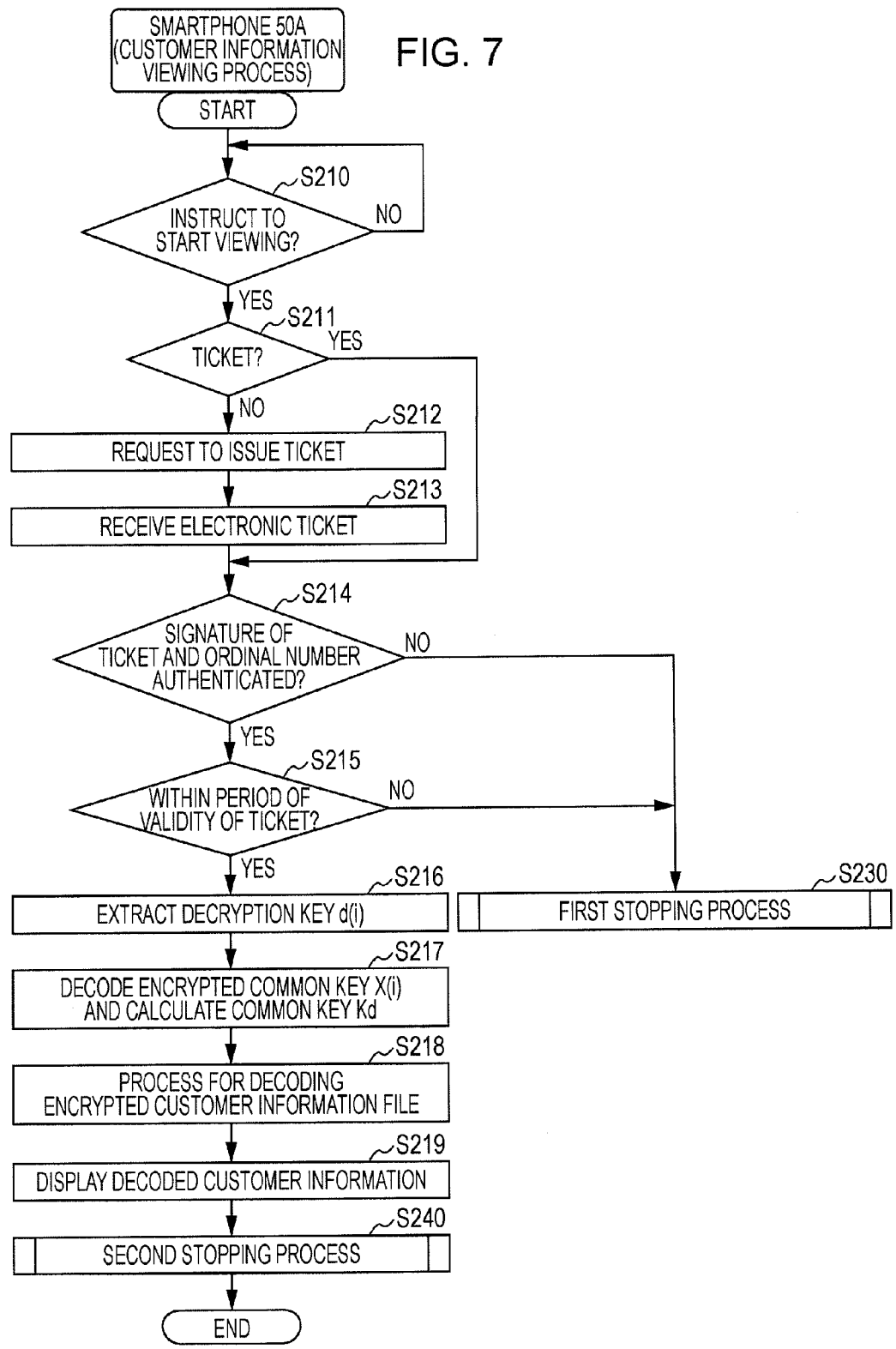
FIG. 7 is a flowchart illustrating a customer information viewing process operation according to the first example.

FIG. 7 is a flowchart illustrating a customer information viewing process operation performed by the smartphone 50A according to the first example.

In FIG. 7, when the user sends an instruction for starting to view customer information using the operation unit 54 (step S210), the viewer 60 searches the ticket storage directory Dt for an electronic ticket T(i) necessary to display the customer information (step S211).

If the ticket storage directory Dt includes the electronic ticket T(i) (YES in step S211), the processing of steps S214 to S240, described below, is performed.

If the ticket storage directory Dt does not include the electronic ticket T(i) (NO in step S211), the viewer 60 communicates with the server 10A, and requests the server 10A to issue the electronic ticket T(i) necessary to view the customer information (step S212).

The ticket issuance request information sent from the viewer 60 when sending a ticket issuance request includes the ordinal number (i) set in the counter 61, and the electronic signature of the viewer 60 is added to the ticket issuance request information using the electronic signature key Kv.

In this case, the viewer 60 may not necessarily use a safe communication path to communicate with the server 10A, but may use a general third-generation mobile communication (3G) line or the like.

Upon receipt of a ticket issuance request from the viewer 60, first, the server 10A verifies the electronic signature added to the ticket issuance request.

If it is verified that the electronic signature is authentic, the server 10A creates an electronic ticket T(i) including the decryption key d(i) corresponding to the ordinal number (i) in the ticket issuance request, and adds the electronic signature Ks of the server 10A to the electronic ticket T(i) before sending the electronic ticket T(i).

Upon receipt (step S213) of the electronic ticket T(i) created by and returned from the server 10A in response to the ticket issuance request in step S212, the viewer 60 stores the electronic ticket T(i) in the ticket storage directory Dt on a temporary basis, and then performs the processing after step S214.

That is, when the electronic ticket T(i) is received from the server 10A or when the presence of a received electronic ticket is detected, in step S214, the viewer 60 verifies the electronic signature of the server 10A, which is added to the received (or detected) electronic ticket T(i), and also verifies the ordinal number (i) (step S214). Then, the viewer 60 reads the period-of-validity information from the electronic ticket T(i) to verify the period of validity of the electronic ticket T(i), that is, the period of validity of the decryption key d(i) (step S215).

The authenticity of the ordinal number (i) verified in step S214 means that the ordinal number (i) set in the counter 61 matches the ordinal number (i) stored in the electronic ticket T(i).

At least if the electronic signature of the server 10A and the ordinal number (i) are not authentic (NO in step S214) or if the electronic ticket T(i) is invalid (NO in step S215), the authenticity of the electronic ticket T(i) is not verified. In this case, in step S230, the viewer 60 implements a first stopping process.

Figure 8:
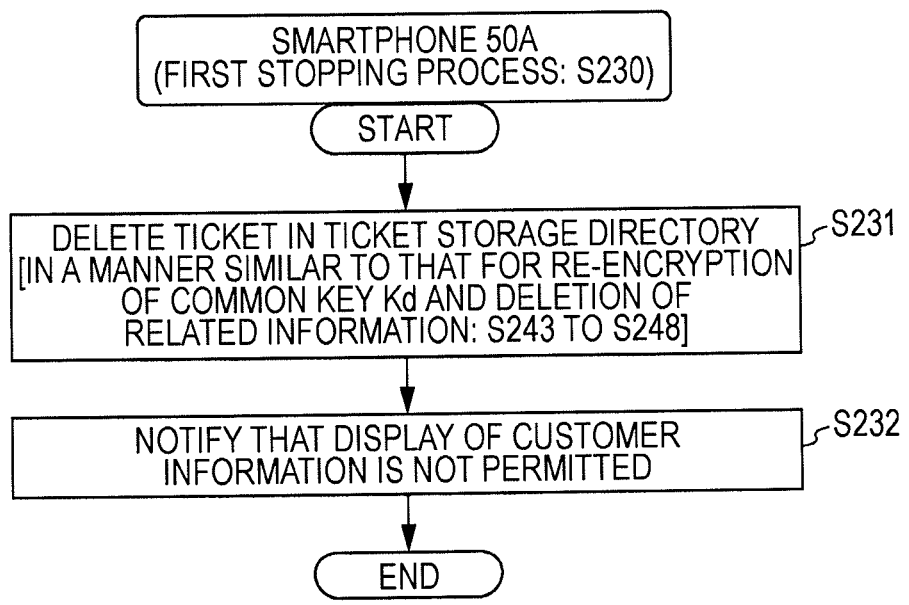
FIG. 8 is a flowchart illustrating a first stopping process in the operation illustrated in FIG. 7.

In the first stopping process (step S230), as illustrated in FIG. 8, the viewer 60 immediately deletes the electronic ticket T(i) from the ticket storage directory Dt (step S231), and notifies the user that the display of the customer information is not allowed (step S232). Then, the process stops.

The deletion of the electronic ticket T(i) in step S231 may be implemented using the processing of steps S243 to S248 in FIG. 9, described in detail below, that is, "a process for re-encrypting the decryption key Kd using the (i+1)-th random number and deleting the decryption key d(i), the common key Kd, and the encryption key (random number r(i+1)) which remain in the memory after re-encryption".

If the electronic signature of the server 10A and the ordinal number (i) are authentic (YES in step S214) and if the electronic ticket T(i) is also valid (YES in step S215), the authenticity of the electronic ticket T(i) is verified. In this case, the viewer 60 extracts the decryption key d(i) from the electronic ticket T(i) (step S216).

Then, the viewer 60 decodes the encrypted common key X(i) held therein using the extracted decryption key d(i), and further calculates the common key Kd (step S217).

In a specific process for decoding the encrypted common key X(i), if the ordinal number is (i), the smallest positive integer that is equivalent to the expression:

$$[X(i)\char`\^\{d(i)\}\bmod N]$$

is calculated for the encrypted common key X(i) when the (i)-th random number r(i) is used as the public key.

In this case, $$[X(i)\char`\^\{d(i)\}=(Kd\char`\^\{r(i)\})\char`\^\{d(i)\}=Kd\bmod N]$$

holds true from $$r(i)d(i)\equiv[1\bmod(p-1)(q-1)]$$

and the Euler's theorem. Through the above computation, it may be found it possible to correctly decode the common key Kd.

In this manner, the common key Kd is further determined from the encrypted common key X(i) decoded using the decryption key d(i) (step S217). After that, the viewer 60 decodes the encrypted customer information file using the common key Kd to produce plaintext customer information that may be viewed by the user (step S218).

Then, the plaintext customer information produced by using the decoding process described above is displayed on the display 53 (step S219).

During the display of the customer information, in step S240, the viewer 60 implements a second stopping process if the viewing operation ends without error, (similarly to the processing of step 231 in FIG. 8 when the electronic ticket T(i) expires). The second stopping process includes a process for re-encrypting the common key Kd and deleting related information such as the (i+1)-th random number used for re-encryption.

Figure 9:
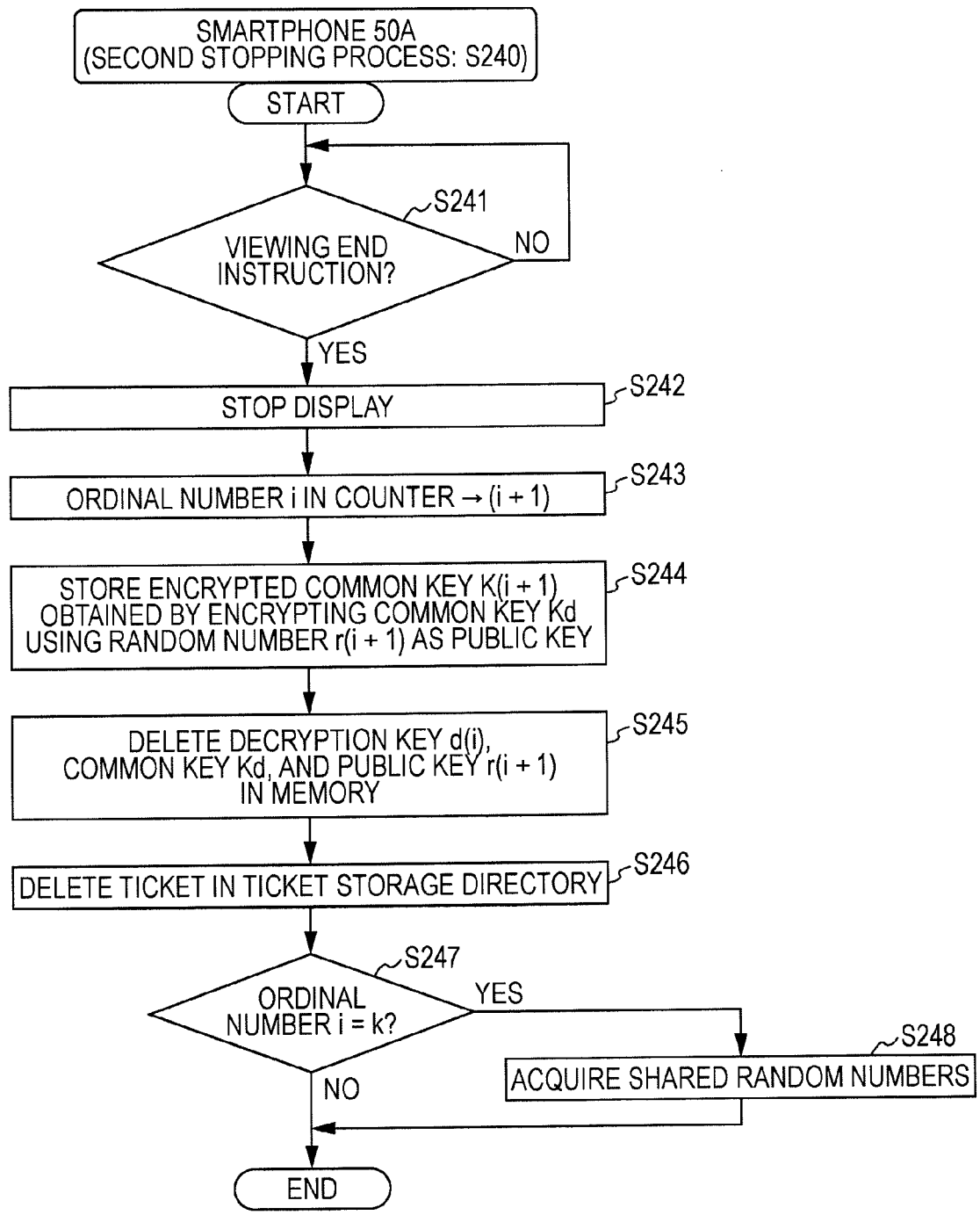
FIG. 9 is a flowchart illustrating a second stopping process in the operation illustrated in FIG. 7.

When the second stopping process starts, as illustrated in FIG. 9, first, the viewer 60 checks whether or not a viewing end instruction has been received (step S241), and continues the display of the customer information until a viewing end instruction has been received.

If a viewing end instruction is received from the user (YES in step S241), the viewer 60 stops the display of the customer information (step S242), and increments the ordinal number (i) set in the counter 61 (step S243).

Then, the viewer 60 re-encrypts the decoded common key Kd residing in the memory of the smartphone 50A using the random number r(i+1) as an encryption key, and then stores the re-encrypted common key Kd as a new encrypted common key (step S244).

When the storage of the updated encrypted common key is completed, the viewer 60 deletes the decryption key d(i), the common key Kd, and the encryption key r(i+1), which reside in the memory of the smartphone 50A (step S245), and further deletes the electronic ticket T(i) in the ticket storage directory Dt (step S246).

Subsequently, the viewer 60 checks whether or not the count value (ordinal number (i)) of the counter 61 has reached the number k of random numbers (step S247).

In the first example, random numbers are also incremented when the electronic ticket T(i) expires. Thus, random numbers are used both when the current process is performed (when the viewing operation ends without error) and when the electronic ticket T(i) expires (the number of random numbers available decreases by one).

If some of the k random numbers held in the viewer 60 still remain and it is determined that the count value (ordinal number (i)) of the counter 61 has not yet reached the number k of random numbers (NO in step S247), the series of processes described above ends.

If all the k random numbers have been used and it is determined that the count value (ordinal number (i)) of the counter 61 has reached the number k of random numbers (YES in step S247), the viewer 60 acquires plural random numbers (a sequence of random numbers different from the used random numbers), which are used for the subsequent processing, from the server 10A (step S248), and holds the acquired plural random numbers as new shared random numbers. Then, the process ends.

In step S248, the viewer 60 acquires random numbers that are shared with the server 10A, using a path such as a VPN.

In the description of the viewing process with reference to FIGS. 7 to 9, by way of example, the period of validity of the electronic ticket T(i) is checked only when a viewing end instruction is received from a user (step S215 in FIG. 7), and the process of re-encrypting the encrypted common key and deleting related information such as the (i+1)-th random number used for re-encryption is implemented (step S231 in FIG. 8) if the electronic ticket T(i) expires. However, the period of validity of the electronic ticket T(i) may be checked at any time including the waiting time, and the process for re-encryption and deletion of related information described above may be implemented immediately when the electronic ticket T(i) expires.

In this first example, furthermore, a function of extending the period of validity of the electronic ticket T(i) may be added.

A period-of-validity extension process which may be performed in this case will be described with reference to FIG. 10.

Figure 10:
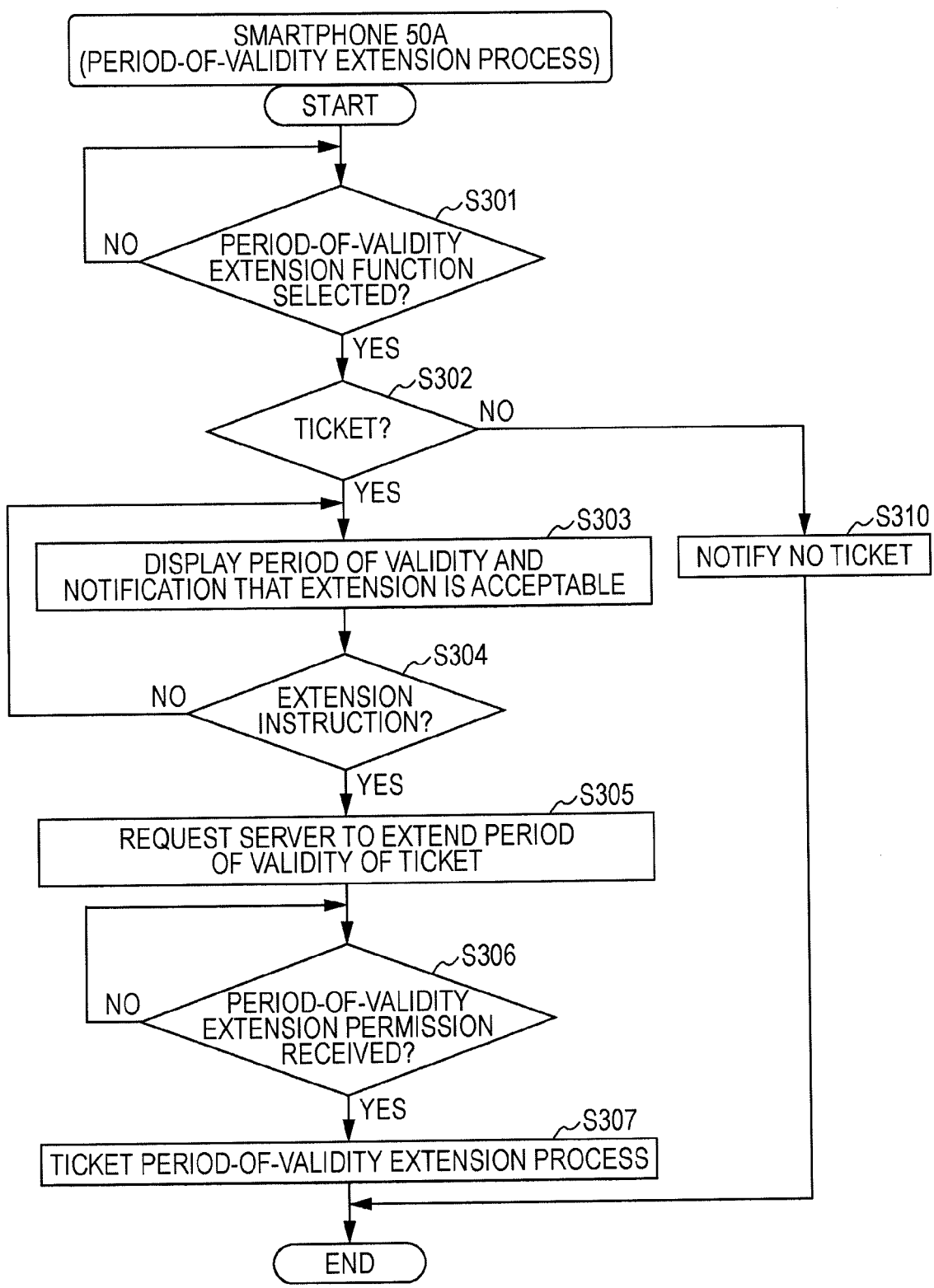
FIG. 10 is a flowchart illustrating a process operation for extending the period of validity of a ticket according to the first example.

In FIG. 10, for example, when the smartphone 50A is in a waiting state, the viewer 60 monitors the smartphone 50A to determine whether or not an instruction for selecting the function of extending the period of validity of the electronic ticket T(i) has been received (step S301).

Upon receipt of an instruction for selecting the function of extending the period of validity (YES in step S301), it is further checked whether or not the electronic ticket T(i) is present (step S302).

If the electronic ticket T(i) is not present (NO in step S302), the user is notified of the result (that is, the electronic ticket T(i) is not present and therefore the extension of the period of validity is not available) (step S310). Then, the process ends.

If the electronic ticket T(i) is present (YES in step S302), the period of validity indicated by the period-of-validity information included in the electronic ticket T(i) is displayed on the display 53 together with guidance that the extension of the period of validity is available (step S303).

If an instruction for extending the period of validity is received from the user during the display of the period of validity (YES in step S304), the viewer 60 sends period-of-validity extension request information including the electronic signature of the smartphone 50A to the server 10A (step S305). The server 10A verifies the signature, and returns period-of-validity extension permission information.

The period-of-validity extension permission information includes the electronic signature of the server 10A.

Upon receipt of the period-of-validity extension permission information returned from the server 10A in response to the period-of-validity extension request information sent in step S305 (YES in step S306), the smartphone 50A verifies the electronic signature of the server 10A included in the period-of-validity extension permission information, and then implements a process for extending the period of validity (step S307). Then, the process ends.

In the first example, by way of example, the period of validity is extended by a predetermined period in response to a period-of-validity extension instruction given by a user. However, an extended period (an extended date of expiry) may be specified when a period-of-validity extension instruction is issued in step S304, and, in step S307, the period of validity may be extended to the specified date.

Alternatively, for example, a process for extending the period of validity if the period of validity has expired during the viewing of content even without any period-of-validity extension instruction given from a user (for example, a process including the processing of steps S305, S306, and S307 in FIG. 10) may be performed.

In the first example, the smartphone 50A may be required to update (or re-encrypt) the encrypted common key by using the update function described above when an electronic ticket held therein has expired (see step S231 in FIG. 8).

Since the update process uses the CPU resource of the smartphone 50A, the viewing of content may be interrupted depending on the performance of the CPU if the expiry date expires during the viewing of the content.

To address such inconvenience, with the use of the function of extending the period of validity described above, the period of validity may be extended if the period of validity expires during the viewing of content. The extension of the period of validity may reduce user's inconvenience caused by stopping the operation of the viewer 60.

Additionally, the function of extending the period of validity (such as the function illustrated in FIG. 10) may be made available only upon permission from the server 10A that has issued the electronic ticket. Therefore, safety may be guaranteed.

In the first example, therefore, the decryption key d(i), the common key Kd, the encryption key (r(i+1)), and the electronic ticket T(i) in the ticket storage directory Dt, which reside in the memory, are deleted from the smartphone 50A when the user finishes viewing content information under normal conditions and when the ticket (electronic ticket) expires.

Further, the common key Kd used for viewing content is re-encrypted using the random number r(i+1) as an encryption key before being stored.

Second Example

In the first example, plural random numbers (r(1), r(2), . . . , r(k)) to which order numbers are assigned are shared between the server 10A and the smartphone 50A (or the viewer 60). In a second example, a random number seed (initial value) may be shared between the server 10A and the smartphone 50A (or the viewer 60), and a cryptographic process may be performed using pseudorandom numbers generated by applying the one-way function to the random number seed multiple times.

A content view control process implemented between a server (referred to as a "server 10B" for convenience) and a smartphone (referred to as a "smartphone 50B" for convenience) according to the second example may be equivalent to that in the first example, except that a random number seed is shared in place of a random number sequence used in the first example and pseudorandom numbers Pn sequentially generated from the random number seed are used as encryption keys and are reflected in various kinds of information.

Figure 11:
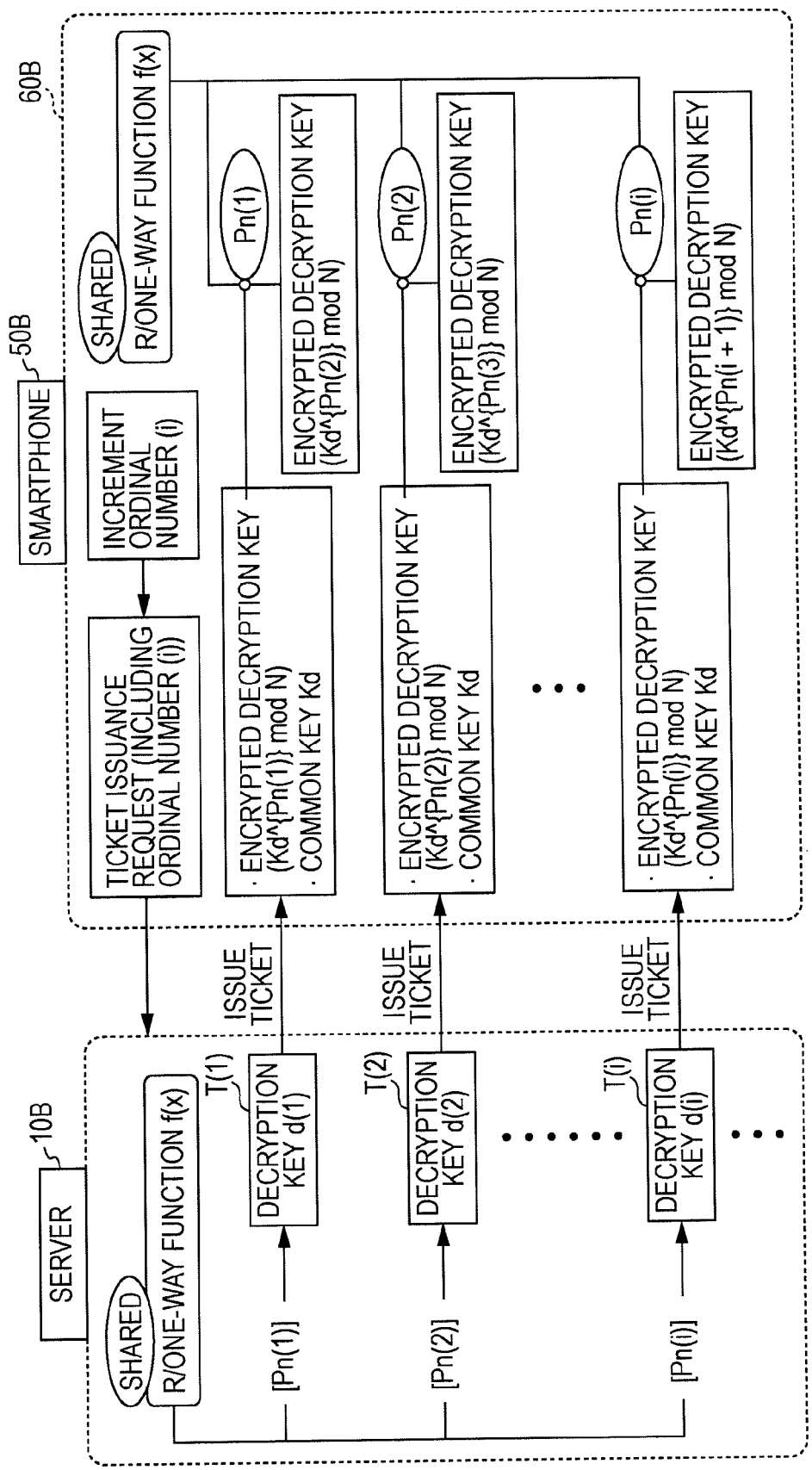
FIG. 11 is a conceptual diagram illustrating a flow of information for content view control according to a second example.

FIG. 11 is a conceptual diagram illustrating a flow of information which may be used in the content view control process implemented between the server (customer information management server) 10B and the smartphone 50B in a customer information management system according to the second example.

As illustrated in FIG. 11, in the second example, the smartphone 50B includes a viewer 60B, and the viewer 60B shares a random number seed Rs and a one-way function f(x) with the server 10B. The random number seed Rs has a predetermined value (initial value) for generating pseudorandom numbers.

Additionally, when the viewing operations ends without error or the electronic ticket T(i) expires, while the counter 61 increments the ordinal number (i) each time the above event occurs, if the electronic ticket T(i) is not present when a viewing start instruction is given by a user, the viewer 60B sends a ticket issuance request including the current ordinal number (i) to the server 10B.

Upon receipt of a ticket issuance request from the viewer 60B, in accordance with the ordinal number (i), if the ordinal number (i) is "1", the server 10B generates the decryption key d(1) using an arithmetic value (Pn(1)) obtained by applying the one-way function f(x) to the random number seed Rs once, and generates an electronic ticket T(1) including the decryption key d(1). Then, the server 10B transmits a response to the smartphone 50B that has issued the ticket request.

Likewise, if the ordinal number included in the ticket issuance request sent from the viewer 60B is i, the server 10B generates the decryption key d(i) using an arithmetic value (Pn(i)) obtained by applying the one-way function f(x) to the random number seed Rs i times, and generates an electronic ticket T(i) including the decryption key d(i), period-of-validity information, and any other suitable information. Then, the server 10B transmits a response to the smartphone 50B that has issued the ticket request.

Upon receipt of the electronic ticket T(i) from the server 10B, the viewer 60B extracts the decryption key d(i) from the electronic ticket T(i) after verifying the authenticity of the electronic signature of the server 10B.

Then, the viewer 60B decodes the encrypted decryption key [Kd^{Pn(i)} mod N] held therein using the decryption key d(i), and further calculates the common key Kd. After that, the viewer 60B decodes the encrypted customer information file using the common key Kd to produce customer information (plaintext), and displays the customer information in a viewable manner.

When the viewing of the customer information ends without error or when the electronic ticket T(i) expires, the viewer 60B increments the ordinal number to (i+1). Then, the viewer 60B re-encrypts the common key Kd using an arithmetic value (Pn(i+1)) obtained by applying the one-way function f(x) to the random number seed Rs (i+1) times, and holds the encrypted decryption key [Kd^{Pn(i+1)} mod N] obtained through re-encryption.

Then, after the encrypted decryption key is held, the decryption key di, the common key Kd, and the encryption key (Pn(i+1)), which remain in the memory, are deleted together with the electronic ticket T(i).

The present invention is not to be limited to the foregoing examples illustrated in the drawings, and a variety of modifications may be made without departing from the scope of the invention.

For example, in the foregoing examples, by way of example, the (i)-th random number or pseudorandom numbers are used as encryption keys. However, the (i)-th random number or pseudorandom numbers may be used to generate encryption keys.

In the foregoing examples, furthermore, the RSA cryptosystem is used for, in particular, the protection of content. Alternatively, the ElGamal cryptosystem or other public-key cryptosystems such as the elliptic curve cryptosystem and the NTRU cryptosystem may be used. Even in such cases, similar advantages may be achieved.

Instead of the AES cryptosystem, other common-key cryptosystems such as Triple Data Encryption Standard (DES) may also be used. Even in such cases, similar advantages may be achieved.

In the foregoing examples, a view control program is installed in a mobile communication terminal implemented on a computer including a CPU and a memory unit such as a ROM or a RAM, and the computer is caused to function as, for example, the counting unit (counter) 61, the ticket request unit 62, the view controller 63, the re-encryption unit 64, the deletion unit 65, the information management unit 66 illustrated in FIG. 6, or like components. However, the program may be stored in a storage medium such as a memory card and may be provided.

Exemplary embodiments of the present invention may provide a content distribution system that holds encrypted content information, decodes the encrypted content information in accordance with a user operation, and displays the content information in a viewable manner, a mobile communication terminal such as a smartphone, and a computer readable medium storing a view control program installed in the mobile communication terminal.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A content distribution system comprising:
    a management device that manages encrypted content information; and
    a viewing device that acquires the encrypted content information from the management device, decodes the encrypted content information, and allows the decoded encrypted content information to be viewed,
    the management device including
        a view control information issuing unit that, upon receipt of a request from the viewing device to issue view control information including an ordinal number (i), issues the view control information including decryption key information corresponding to an (i)-th random number corresponding to the ordinal number (i) among a plurality of random numbers and period-of-validity information about a period of validity, the plurality of random numbers being shared between the management device and the viewing device,
    the viewing device including
        a storage unit that stores the encrypted content information acquired from the management device,
        a counting unit that counts the ordinal number (i),
        a holding unit that holds encrypted common key information, the encrypted common key information being encrypted using the (i)-th random number corresponding to the ordinal number (i) among the plurality of random numbers,
        a request unit that sends a request to the management device to issue the view control information including the ordinal number (i),
        a calculation unit that calculates common key information by receiving the view control information transmitted from the management device in response to the request sent from the request unit and by decoding the encrypted common key information held in the holding unit using the decryption key information included in the view control information,
        a display controller that decodes the encrypted content information stored in the storage unit using the common key information calculated by the calculation unit to produce viewable content information, and that displays the viewable content information,
        an update unit that updates the encrypted common key held in the holding unit when the period of validity indicated by the period-of-validity information included in the received view control information expires, by re-encrypting the common key information calculated by the calculation unit using an (i+1)-th random number corresponding to an ordinal number (i+1) counted by the counting unit, and
        a deletion unit that deletes the common key information subjected to re-encryption, the (i+1)-th random number used for re-encrypting the common key information among the plurality of shared random numbers being shared between the management device and the viewing device, and the view control information after the update unit has updated the encrypted common key information.

2. The content distribution system according to claim 1, wherein the update unit updates the encrypted common key held in the holding unit, upon receipt of an operation for giving an instruction to end viewing the viewable content information displayed by the display controller.

3. The content distribution system according to claim 1, wherein the management device and the viewing device hold a random number serving as an initial value, and a one-way function, and use a pseudorandom number as the (i)-th random number among the plurality of shared random numbers corresponding to the ordinal number (i), the pseudorandom number being obtained by applying the one-way function to the random number serving as the initial value (i) times.

4. The content distribution system according to claim 1, wherein the view control information issued by the view control information issuing unit in the management device further includes management device signature information about a signature of the management device, and
    wherein the viewing device further includes a verification unit that verifies authenticity of the management device signature information included in the view control information.

5. The content distribution system according to claim 1, wherein the viewing device further includes
    a period-of-validity extension request unit that makes a request to extend the period of validity indicated by the period-of-validity information included in the received view control information, and
    a period-of-validity extension unit that extends the period of validity in accordance with permission to extend the period of validity, the permission being given from the management device in response to the request made by the period-of-validity extension request unit.

6. The content distribution system according to claim 5, wherein in the viewing device, the period-of-validity extension request unit further makes the request, the request including viewing device signature information about a signature of the viewing device, and
    wherein the management device further includes
        a verification unit that verifies authenticity of the viewing device signature information included in the request made by the period-of-validity extension request unit, and
        a response transmission unit that transmits the permission to extend the period of validity to the viewing device in response to the request sent from the period-of-validity extension request unit if the verification unit has verified the authenticity of the viewing device signature information.

7. A mobile communication terminal device connected to a management device that manages encrypted content information so that the mobile communication terminal device may communicate with the management device, the mobile communication terminal device comprising:

a storage unit that stores the encrypted content information acquired from the management device;
at least one processor which executes:
a counting unit that counts an ordinal number (i);
a holding unit that holds encrypted common key information, the encrypted common key information being encrypted using an (i)-th random number corresponding to the ordinal number (i) among a plurality of random numbers shared between the mobile communication terminal device and the management device;
a request unit that sends a request to the management device to issue view control information including the ordinal number (i);
a calculation unit that calculates common key information by receiving view control information transmitted from the management device in response to the request sent from the request unit, the view control information including decryption key information corresponding to the (i)-th random number corresponding to the ordinal number (i) among the plurality of random numbers and period-of-validity information about a period of validity, and by decoding the encrypted common key information held in the holding unit using the decryption key information included in the view control information;
a display controller that decodes the encrypted content information stored in the storage unit using the common key information calculated by the calculation unit to produce viewable content information, and that displays the viewable content information;
an update unit that updates the encrypted common key held in the holding unit when the period of validity indicated by the period-of-validity information included in the received view control information expires, by re-encrypting the common key information calculated by the calculation unit using an (i+1)-th random number corresponding to an ordinal number (i+1) counted by the counting unit; and
a deletion unit that deletes the common key information subjected to re-encryption, the (i+1)-th random number used for re-encrypting the common key information among the plurality of random numbers shared between the mobile communication terminal device and the management device, and the view control information after the update unit has updated the encrypted common key information.

8. A non-transitory computer readable medium storing a program causing a computer to execute a process for performing view control using a viewing device connected to a management device that manages encrypted content information so as to be able to communicate with the management device, by performing control to acquire the encrypted content information from the management device and decode the encrypted content information to produce viewable content information, the process comprising:
storing the encrypted content information acquired from the management device;
counting an ordinal number (i);
holding encrypted common key information, the encrypted common key information being encrypted using an (i)-th random number corresponding to the ordinal number (i) among a plurality of random numbers shared between the viewing device and the management device;
sending a request to the management device to issue view control information including the ordinal number (i);
calculating common key information by receiving view control information transmitted from the management device in response to the sent request, the view control information including decryption key information corresponding to the (i)-th random number corresponding to the ordinal number (i) among the plurality of random numbers and period-of-validity information about a period of validity, and by decoding the held encrypted common key information using the decryption key information included in the view control information;
decoding the stored encrypted content information using the calculated common key information to produce viewable content information, and displaying the viewable content information;
updating the held encrypted common key when the period of validity indicated by the period-of-validity information included in the received view control information expires, by re-encrypting the calculated common key information using an (i+1)-th random number corresponding to a counted ordinal number (i+1); and
deleting the common key information subjected to re-encryption, the (i+1)-th random number used for re-encrypting the common key information among the plurality of random numbers shared between the mobile communication terminal device and the management device, and the view control information after the encrypted common key has been updated.

* * * * *